US011525211B2

(12) United States Patent
Aydin et al.

(10) Patent No.: US 11,525,211 B2
(45) Date of Patent: Dec. 13, 2022

(54) BIO-BASED POLYELECTROLYTE COMPLEX COMPOSITIONS COMPRISING NON-WATER SOLUBLE PARTICLES

(71) Applicant: ORGANOCLICKAB, Täby (SE)

(72) Inventors: Juhanes Aydin, Södertälje (SE); Maria Wennman, Solna (SE)

(73) Assignee: ORGANOCLICK AB, Taby (SE)

(*) Notice: Subject to any disclaimer, the term of this patent is extended or adjusted under 35 U.S.C. 154(b) by 82 days.

(21) Appl. No.: 16/282,608

(22) Filed: Feb. 22, 2019

(65) Prior Publication Data

US 2019/0226141 A1    Jul. 25, 2019

Related U.S. Application Data

(63) Continuation of application No. PCT/SE2017/050850, filed on Aug. 24, 2017.

(30) Foreign Application Priority Data

Aug. 24, 2016 (SE) .................... 1651136-2
Aug. 24, 2016 (SE) .................... 1651138-8

(51) Int. Cl.
| | | |
|---|---|---|
| C08L 5/08 | (2006.01) | |
| D06B 1/00 | (2006.01) | |
| D06M 15/03 | (2006.01) | |
| C08L 1/28 | (2006.01) | |
| D21H 23/22 | (2006.01) | |
| D21H 23/54 | (2006.01) | |
| D21H 23/56 | (2006.01) | |
| D21H 23/62 | (2006.01) | |
| D21H 23/50 | (2006.01) | |
| D21H 23/34 | (2006.01) | |
| C08K 3/013 | (2018.01) | |
| C08K 3/36 | (2006.01) | |

(Continued)

(52) U.S. Cl.
CPC ............. *D06M 15/03* (2013.01); *C08K 3/013* (2018.01); *C08K 3/36* (2013.01); *C08K 5/07* (2013.01); *C08K 5/09* (2013.01); *C08K 5/10* (2013.01); *C08L 1/286* (2013.01); *C08L 5/08* (2013.01); *D06B 1/00* (2013.01); *D21H 5/003* (2013.01); *D21H 5/0005* (2013.01); *D21H 5/0027* (2013.01); *D21H 5/0037* (2013.01); *D21H 5/0047* (2013.01); *D21H 17/24* (2013.01); *D21H 19/44* (2013.01); *D21H 23/34* (2013.01); *D21H 23/62* (2013.01); *C08K 2201/005* (2013.01); *C08L 57/00* (2013.01); *C08L 67/04* (2013.01); *C08L 89/00* (2013.01)

(58) Field of Classification Search
CPC ....... D06M 15/03; D21H 23/34; D21H 23/62; D21H 5/0047; D21H 5/0037; D21H 5/0027; D21H 5/003; D21H 5/0005; D21H 17/24; D21H 19/44; C08K 3/013; C08K 3/36; C08K 3/07; C08K 5/09; C08K 5/10; C08K 2201/005; C08L 1/286; C08L 5/08; C08L 57/00; C08L 67/04; C08L 89/00; D06B 1/00
See application file for complete search history.

(56) References Cited

U.S. PATENT DOCUMENTS

| | | | |
|---|---|---|---|
| 6,060,410 A | 5/2000 | Gadsby | |
| 6,555,225 B1 * | 4/2003 | Yoshioka | ................ A61L 33/00 427/180 |

(Continued)

FOREIGN PATENT DOCUMENTS

| | | |
|---|---|---|
| CN | 102120514 A | 7/2011 |
| CN | 105061821 A | 11/2015 |

(Continued)

OTHER PUBLICATIONS

Gärdlund, L. et al. "Polyelectrolyte complexes for surface modification of wood fibres II. Influence of complexes on wet and dry strength of paper" In: Colloids and Surfaces A: Physicochem. Eng. Aspects, 2003, vol. 218, pp. 137-149; abstract; pp. 137-139.

(Continued)

*Primary Examiner* — Alexander M Weddle
(74) *Attorney, Agent, or Firm* — Renner, Otto, Boisselle & Sklar, LLP

(57) ABSTRACT

The present invention relates to a bio-based polyelectrolyte complex (PEC) composition suitable as a binder for fiber based materials, textiles, woven and nonwoven materials, said PEC composition comprising cationic biopolymer, anionic biopolymer, acid and preservative, and wherein the net charge of the PEC is cationic, the charge ratio of the anionic polymer and the cationic polymer is ≤1, the cationic biopolymer is chitosan, the anionic biopolymer is a polyanion derived from nature, the acid is a Brønsted acid and/or a Lewis acid, wherein the Brønsted acid is selected from any organic and/or inorganic acids, and wherein the Lewis acid is selected from any cationic mono- or multivalent atom, the weight ratio between cation and anion is 1:0.1 to 1:20, the weight ratio between the cation and acid is 1:0.01 to 1:30, chitosan has a degree of deacetylation being 66-100%, the pH is less than 7, and wherein said composition further comprises one or more non-water soluble particles. The present invention further relates to a method for preparing the PEC composition, uses of the PEC composition, as well as method of treating materials with the PEC composition.

11 Claims, No Drawings

(51) Int. Cl.
| | |
|---|---|
| C08K 5/07 | (2006.01) |
| C08K 5/09 | (2006.01) |
| C08K 5/10 | (2006.01) |
| D21H 17/24 | (2006.01) |
| D21H 19/44 | (2006.01) |
| C08L 57/00 | (2006.01) |
| C08L 67/04 | (2006.01) |
| C08L 89/00 | (2006.01) |

(56) References Cited

U.S. PATENT DOCUMENTS

| | | | |
|---|---|---|---|
| 2006/0205932 A1* | 9/2006 | Cowan | C08B 37/003 536/20 |
| 2007/0141013 A1 | 6/2007 | Nguyen-Kim | |
| 2008/0005852 A1* | 1/2008 | Hu | D06M 15/263 8/115.51 |
| 2011/0236450 A1 | 9/2011 | Scheuing et al. | |
| 2011/0236582 A1* | 9/2011 | Scheuing | A01N 59/16 427/331 |
| 2013/0143041 A1 | 6/2013 | Mathias | |
| 2013/0164311 A1 | 6/2013 | De Carlo et al. | |
| 2013/0216592 A1 | 8/2013 | Delair et al. | |
| 2015/0105478 A1 | 4/2015 | Van Der Krieken et al. | |

FOREIGN PATENT DOCUMENTS

| | | |
|---|---|---|
| CN | 105148741 A | 12/2015 |
| DE | 10120748 A1 | 10/2002 |
| DE | 102010001891 A1 | 8/2011 |
| DE | 102012012561 A1 | 4/2014 |
| EP | 0504245 A1 | 9/1992 |
| EP | 1096056 A1 | 5/2001 |
| EP | 1247568 A1 | 10/2002 |
| EP | 1254983 A1 | 11/2002 |
| EP | 1579071 B1 | 9/2005 |
| EP | 1918456 A1 | 5/2008 |
| EP | 1942226 A1 | 7/2008 |
| JP | 05117111 A | 5/1993 |
| JP | 06277038 A | 10/1994 |
| JP | 3289055 B2 | 6/2002 |
| JP | 2005247967 A | 9/2005 |
| RU | 2594422 C1 | 8/2016 |
| WO | 1993012282 A1 | 6/1993 |
| WO | 9728311 A1 | 8/1997 |
| WO | 0121671 A1 | 3/2001 |
| WO | 2006029407 A2 | 3/2006 |
| WO | 2007083262 A1 | 7/2007 |
| WO | 2009142719 A2 | 11/2009 |
| WO | 2013133705 A1 | 9/2013 |
| WO | 2013133706 A1 | 9/2013 |
| WO | 2015034357 A1 | 3/2015 |

OTHER PUBLICATIONS

Fatehi, P. et al. "Complex formation of modified chitosan and carboxymethyl cellulose and its effect on paper properties" In: Tappi Journal, 2009, vol. 8, pp. 29-35; pp. 29-30.

Fatehi, P. et al. "Synergy of CMC and modified chitosan on strength properties of cellulosic fiber network" In: Carbohydrate Polymers, 2010, vol. 80, pp. 208-214; pp. 208-209.

Szymanaska et al. "Stability of Chitosan—A challenge for pharmaceutical and biomedical applications" In:Marine Drugs, 2015, vol. 13, pp. 1819-1846.

Zhao Q et al: "Synthesis and characterization of soluble chitosan/sodium carboxymethyl cellulose polyelectrolyte complexes and the pervaporation dehydration of their homogeneous membranes".

Jiang Liuyun et al: "A novel composite membrane of chitosan-carboxymethyl cellulose polyelectrolyte complex membrane filled with nano.hydroxypatite I. Preparation and properties". Journal of Materials Science: Materials in Medicine, Kluwer Academic Publishers; BO, vol. 20, No. 8, Mar. 20, 2009, pp. 1645-1652.

Drogoz, A. et al. "Towards Biocompatible Vaccine delivery Systems: Interactions of Colloidal PECs Based on Polysaccharides with HIV-1 p24 Antigen" In: Biomacromolecules, 2008, vol. 9, pp. 583-591;pp. 583-584.

Dian-Yu Ji et al: "A novel injectable chitosan/polyglutamate polyelectrolyte complex hydrogel with hydroxyapatite for soft-tissue augmentation", Carbohydrate Polymers; Applied Science Publishers, LTD. Barking, GB, vol. 89, No. 4, Mar. 26, 2012, pp. 1123-1130.

Zhao Q et al : "Synthesis sand characterization of soluble chitosan/sodium carboxymethyl cellulose polyelectrolyte complexes and the pervaporation dehydration of their homogeneous membranes", Journal of Membrane Science , Elsevier BV , NL, vol. 333, No. 1-2, May 1, 2009 (May 1, 2009), pp. 68-78 , XP026031531, ISSN : 0376-7388, DOI: 10.1016/ J.MEMSCI.2009 .02 .001 [retrieved on Feb. 10, 2009].

Chitosan Product Specification, www.sigmaaldrich.com.

Nirmala Devi et al: "A novel microencapsulation of neem (*Azadirachta Indica A. Juss.* ) seed oil (NSO) in polyelectrolyte complex of [kappaJ-carrageenan and chitosan", Journal of Applied Polymer Science, vol. 113 , No. 3, Aug. 5, 2009 (Aug. 5, 2009), pp. 1576-1583.

Albertini Beatrice et al: "Novel multifunctional platforms for potential treatment of cutaneous wounds: Development and in vitro characterization", International Journal of Pharmaceutics, Elsevier, Amsterdam, NL, vol. 440, No. 2, Jun. 9, 2012 (Jun. 9, 2012), pp. 238-249.

Nirmala Devi et al: "Genipin Crosslinked Chitosan-[kappaJ-carrageenan Polyelectrolyte Nanocapsules for the Controlled Delivery of Isoniazid", International Journal of Polymeric Materials., vol. 59, No. 10, Aug. 2, 2010 (Aug. 2, 2010), pp. 828-841.

\* cited by examiner

BIO-BASED POLYELECTROLYTE COMPLEX COMPOSITIONS COMPRISING NON-WATER SOLUBLE PARTICLES

This application is the continuation of International Application No. PCT/SE2017/050850, filed 24 Aug. 2017, which claims the benefit of Swedish Patent Application No. SE 1651136-2, filed 24 Aug. 2016, and Swedish Patent Application No. SE 1651138-8, filed 24 Aug. 2016, the entire contents of which are hereby incorporated by reference.

FIELD OF THE INVENTION

The present invention relates to bio-based polyelectrolyte complex (PEC) compositions which are environmentally benign, renewable and biodegradable. The PEC compositions comprise chitosan as a cationic polymer, an anionic polymer being represented by polyanions derived from nature, especially polysaccharides, and one or more additives.

The PEC compositions according to the present invention are suitable as binders for fiber based materials, textiles, woven and nonwoven materials. The treatment of fiber based materials, textiles, woven and nonwoven materials with the PEC composition of the present invention provides materials which have higher dry and/or wet strengths, i.e. higher dry and/or wet tensile indexes. Thanks to the one or more additives they contain, the PEC compositions can transfer specific properties of the additives to the treated materials.

BACKGROUND INFORMATION

PECs are the association complexes formed between oppositely charged particles such as polymer-polymer, polymer-drug and polymer-drug-polymer. These complexes are formed due to electrostatic interaction between oppositely charged polyions and thereby avoids the use of chemical cross linking agents (S. Lankalapalli, 2009). Based on origin PECs are classified as natural polyelectrolytes, synthetic polyelectrolytes and chemically modified biopolymers.

The PEC composition according to the present invention comprises organic molecules of biological origin (i.e. biopolymers) represented by polyanions derived from nature which are either natural polyelectrolytes or chemically modified biopolymers. Hence, the PECs do not comprise synthetic polymers and synthetic polyelectrolytes and therefore the PEC compositions according to the present invention are bio-based PEC compositions.

EP0723047 relates to PEC suspensions for papermaking. However, the PEC suspensions do not comprise chitosan as a cation. Instead the cation is a synthetic polymer such as a copolymer of acrylamide with diallyldimethylammonium chloride. Hence, the PECs in EP0723047 are not bio-based PECs. More importantly, there is no data or reference to (i) any increase in wet strength of treated materials, (ii) effect on tensile stiffness of treated materials, and/or (iii) stability of the PECs over a period of several months.

EP1918455 relates to producing fibrous webs by using PECs having a negative net charge. Furthermore, the PECs do not comprise chitosan as a cation. Instead the cation is a synthetic polymer such as acrylic polymers, polyacrylamides and amido-amine polymers. Consequently, the PECs according to EP1918455 are not bio-based.

U.S. Pat. Nos. 8,993,505, 9,012,389 and 9,273,220 relate to PECs for reduced soiling tendency, reduced cleaning effort and reducing microbial challenge. However, the PECs are not wholly of biological origin since they in addition to biopolymers also comprise synthetic polymer such as (i) homopolymer of diallyl dimethyl ammonium chloride "DADMAC" disclosed in claim 1 of U.S. Pat. No. 8,993,505, (ii) homopolymer of acrylic acid or a random copolymer of acrylic acid disclosed in claim 1 of U.S. Pat. No. 9,012,389, (iii) homo- or copolymers of the following anionic monomers: acrylic acid, methacrylic acid, maleic acid, maleic anhydride, itaconic acid, styrene sulfonic acid and acrylamide propane sulfonic acid disclosed in U.S. Pat. No. 9,273,220.

Consequently, the PECs according to U.S. Pat. Nos. 8,993,505, 9,012,389 and 9,273,220 are not bio-based. More importantly, there are no data or reference to (i) any increase in dry strength and wet strength of treated materials, (ii) effect on tensile stiffness of treated materials, and/or (iii) stability of the PECs over a period of several months. Hence, none of U.S. Pat. Nos. 8,993,505, 9,012,389 and 9,273,220 have the same purpose or aim as the present invention.

US2013216592 relates to PECs consisting of biopolymers. More importantly, there are no data or reference to (i) any increase in dry strength and wet strength of treated materials, (ii) effect on tensile stiffness of treated materials, and/or (iii) stability of the PECs over a period of several months. Hence, US2013216592 does not have the same purpose or aim as the present invention.

U.S. Pat. No. 6,936,746 relates to PEC solid material systems. Hence, the PECs are in the form of solid materials and not as solutions. Moreover, U.S. Pat. No. 6,936,746 is silent about the net charge of the PECs. Furthermore, U.S. Pat. No. 6,936,746 is also silent about the charge ratio between the cationic polymer and the anionic polymer. More importantly, there is no data or reference to (i) any increase in dry strength and wet strength of treated materials, (ii) effect on tensile stiffness of treated materials, and/or (iii) stability of the PECs over a period of several months. U.S. Pat. No. 6,936,746 does not have the same purpose or aim as the present invention.

Furthermore, specific embodiments of PEC composition described in the prior art have a concentration of 0.04% PEC due to stability issues. Hence there is also a need for PEC compositions having a higher concentration of PEC.

OBJECT OF THE INVENTION

It is an object of the present invention to overcome the drawbacks and disadvantages of the above described compositions and to provide a bio-based PEC composition that is environmentally benign, renewable and biodegradable.

A further object of the present invention is to transfer mechanical properties (dry strength, wet strengths, tensile stiffness and/or tensile softness) to materials treated with a PEC composition.

A further object of the present invention is to transfer hydrophobicity to materials treated with a PEC composition.

A further object of the present invention is to transfer hydrophilicity to materials treated with a PEC composition.

A further object of the invention is to provide a bio-based PEC composition which is stable for at least 1.5 months.

A further object of the invention is to provide a bio-based PEC composition comprising at least 0.04 wt %, preferably at least 1.5 wt % PEC, more preferably at least 4 wt % PEC, most preferably 4-10 wt % PEC.

A further object of the invention is to provide a bio-based PEC composition which does not mold.

A further object of the invention is to provide a bio-based PEC composition which comprises an anionic biopolymer which has a low cost.

A further object of the invention is to provide a bio-based PEC composition which is suitable as a binder for fiber based materials, textile, woven and nonwoven materials, and for pulp, paper and paperboard.

A further object of the invention is to provide a bio-based PEC composition which is stable in tap water. According to prior art minerals in water destabilizes the PEC.

A further object of the invention is to provide a bio-based PEC composition having the ability to transport and transfer specific properties from additives, such as wet tensile strength, hydrophobicity, etc. to fiber based materials, textiles, woven and nonwoven materials.

A further object according to the invention is to provide a biopolymer PEC composition, wherein the nonwoven materials are mineral fibres such as glass or rock fibres.

A further object of the invention is to provide a method for achieving the above bio-based PEC compositions.

A further object of the invention is to provide fiber based, textile, woven and nonwoven materials which have (i) high wet tensile strength, and/or (ii) high dry tensile strength and/or (iii) softness and/or (iv) stiffness and/or (v) hydrophobicity.

Any combination of the above objects is also possible.

SUMMARY OF THE INVENTION

The objects of the invention are attained by a bio-based PEC composition comprising cationic biopolymer, anionic biopolymer, acid and preservative. The expression bio-based indicates that the PEC composition is of biological origin.

The PEC composition of the present invention further comprises non-water soluble particles. By non-water soluble particles are herein understood any solid compound having a solubility in water not exceeding 15 wt %. Further non-water soluble particles are one or more plastic particles and/or bioplastic particles and/or protein particles and/or hydrophobic particles.

While the PEC composition is of biological origin, the non-water soluble particles and the additives can be, independently of each other, of natural or synthetic origin.

The net charge of the PEC composition is cationic and the charge ratio between the anionic polymer and the cationic polymer is 1. Moreover, the weight ratio between cationic polymer and anionic polymer is 1:0.1 to 1:20. Ratios in the present invention are weight ratios unless otherwise indicated.

The PEC composition according to the present invention comprises chitosan which imparts higher tensile index when compared to other cations such as cationic starch and cationic cellulose. Hence, the preferred embodiments of the invention comprise cationic chitosan as cationic biopolymer. The concentration of chitosan in the composition is 0.005-30 wt %, Moreover, chitosan preferably has a degree of deacetylation which ranges from 66%-100%. The degree of deacetylation is important for the physical properties of chitosan in the PEC composition.

The anionic biopolymer being a polyanion derived from nature can be selected from lignin alkali, lignosulfonic acid, or a polysaccharide, such as carboxymethyl cellulose (CMC), alginic acid (preferably the sodium salt), xanthan gum, pectin, carrageenan and nanocrystalline cellulose (NCC) and gum arabic. Lignin alkali and lignosulfonic acid may preferably be in the form of their sodium salt. The concentration of anionic biopolymer in the composition is 0.005-30% by weight. Concentrations in % in the present invention are concentrations in weight % unless otherwise indicated.

The pH of the PEC composition is below pH 7 and this may be achieved by Brønsted acid and/or a Lewis acid. Preferably, the pH of the PEC composition is lower than 6.5. Brønsted acids are selected from any organic or inorganic acids, wherein the concentration of the acid is 0.01-30%. Lewis acids are selected from any cationic mono- or multivalent atom, wherein the concentration of the Lewis acid is 0.01-30 The PEC composition preferably has a pH value of 24. The weight ratio between the cationic polymer and the acid is 1:0.01 to 1:30 in the PEC composition. The acid of the PEC composition is selected from one or more of acetic acid, acetylsalicylic acid, adipic acid, benzenesulfonic acid, camphorsulfonic acid, citric acid, dihydroxy fumaric acid, formic acid, glycolic acid, glyoxylic acid, hydrochloric acid, lactic acid, malic acid, malonic acid, maleic acid, mandelic acid, oxalic acid, para-toluenesulfonic acid, phthalic acid, pyruvic acid, salicylic acid, sulfuric acid, tartaric acid and succinic acid, more preferably citric acid, oxalic acid and tartaric acid, even more preferably citric acid, and most preferably citric acid monohydrate.

The concentration of the PEC in the PEC composition is at least 0.04 wt % PEC, preferably at least 1.5 wt % PEC, more preferably at least 4 wt % PEC, most preferably 4-10 wt % PEC. Furthermore, the PEC composition according to the present invention is dilutable. Manufacturing of highly concentrated PEC compositions is advantageous in view of lowering shipping cost, i.e. the PEC composition can be prepared with a high concentration and then diluted after shipping by the user or customer.

The solvent of the PEC composition is water selected from distilled water, tap water, and deionized water. PEC compositions comprising chitosan are in the prior art known for being unstable in tap water and are therefore prepared in distilled water. However, the PEC composition according to the present invention is stable in tap water.

The PEC composition of the present invention may also be prepared in neat form, i.e. the PEC composition does not comprise added water.

The PEC composition comprises one or more additives selected from, water soluble plasticizer, defoamer, foaming agent, wetting agent, coalescent agent, catalyst, surfactant, emulsifier, conservative, cross-linker, rheology modifier, filler, nonionic polymer, dye, pigment. Said one or more additives are selected depending on the application method and the expected properties of the final material, wherein the concentration of the additive(s) is 0-99 wt %, preferably 0-50 wt %, most preferably 0-30 wt %.

The preservative may be selected from the group consisting of a fungicide, bactericide, pharmaceutical preservative, cosmetic preservative and/or food preservative. The concentration of the preservative is 0.005-10 wt %, preferably 0.005-1.5 wt %, more preferably 0.005-0.5 wt %. Moreover, the preservative is preferably biodegradable and/or renewable. Food preservatives, pharmaceutical preservatives and cosmetic preservatives are preferred since they are non-toxic. The inclusion of a preservative helps to inhibit the growth of mold in the PEC composition. Moreover, we have discovered that PEC compositions without preservative becomes more yellow/brown than a composition comprising preservative. Even if performance is the same between the more yellow and less yellow PEC composition, the yellow color is transferred to material and causes yellowing which is unwanted especially for nonwovens and fiber based materials such as textiles.

The PEC composition of the present invention further comprises one or more non-water soluble particles. The composition's ability to incorporate and transport the non-water soluble particles gives the opportunity of transferring the properties of named non-water soluble particles to different materials treated with the PEC composition. This ability is explored by the present invention.

The non-water soluble particles of the present invention may be present in the PEC composition at a weight ratio of PEC:non-water soluble particles of 1:0.01 to 1:50, preferably 1:0.05 to 1:20, more preferably 1:0.1 to 1:10, most preferably 1:0.5 to 1:1. Moreover, the non-water soluble particles of the present invention have a particle size preferably in the range of 100 nm-1 mm, more preferably of 100 nm-500 µm, even more preferably of 100 nm-300 µm.

The non-water soluble particles may be of the following types, namely plastics, bioplastics, hydrophobic particles, proteins, solid waxes, solid resins, fillers, pigments, fumed silica, and mixtures thereof.

The plastics employed in the PEC composition of the present invention may be selected from the group consisting of Polyester, Polyethylene terephthalate, Polyethylene, High-density polyethylene, Polyvinyl chloride, Polyvinylidene chloride, Low-density polyethylene, Polypropylene, Polystyrene, High impact polystyrene, Polyamides, Acrylonitrile butadiene styrene, Polyethylene/Acrylonitrile Butadiene Styrene, Polycarbonate, Polycarbonate Butadiene Styrene, Acrylonitrile Butadiene Styrene, Polyurethanes, Maleimide, Bismaleimide, Melamine formaldehyde, Phenolics, Polyepoxide, Polyetheretherketone, Polyetherimide, Polyimide, Polymethyl methacrylate, Polytetrafluoroethylene, Urea-formaldehyde, Furan resin, Silicone, Polysulfone, Polyoxymethylene, preferably selected from Polycaprolactone, Polyethylene terephthalate, Polyethylene, Polypropylene and mixtures thereof.

Where the plastics are of biological nature, they can preferably be selected from the group consisting of polylactic acid (PLA), PLA co-copolymers such as L-PLA, D-PLA, DL-PLA, PLGA, PDLA, polyhydroxy alkanoates (PHA) and variations of thereof such as PHB, PHBV, P3HB, P4HB, PHbHHx, P(3HB-co 20% mol-3HV, P(3HB-co 4HB), P(3HB-co 6% mol-3HA), P(3HB-co 4HP), P(3HB-co 3HHX), PHBHHx), ethylcellulose, cellulose acetate, thermoplastic starch, polybutylene succinate, preferably selected from PLA, PHA and thermoplastic starch, and mixtures thereof.

PEC composition according to the present invention may contain proteins as non-water soluble particles, preferably selected from one or more of pea protein, vital wheat gluten, wheat gluten, lupine protein, soy protein, soybean protein, maize protein, zein protein, peanut protein, caseine, and similar plant-based or yeast based proteins as isolates and/or flours. Other useful proteins are hydrophobins (small proteins of from about 100 to 150 amino acids and are characteristic of filamentous fungi, for example *Schizophyllum commune*. They generally have 8 cysteine units.), keratin, animal protein such as fish protein, albumin, milk protein, and Non-limiting examples of other sources of vegetable protein include, for example, proteins extracted from nuts, seeds, grains, and legumes. These sources include, but are not limited to, almonds, brazil nuts, cashews, walnuts, pecans, hazel nuts, macadamia nuts, sunflower seeds, pumpkin seeds, corn, and the like. Other sources include protein-containing biomasses, such as waste sludge, manure, and composted manure. More preferred proteins are pea protein, vital wheat gluten, wheat gluten, lupine protein, soybean protein, maize protein, zein protein, caseine and keratin.

The non-water soluble particles may originate from solid waxes, as vegetable and/or animal waxes, having a melting point of 27° C.-220° C. They may preferably be selected from the group consisting of Bayberry wax, candelilla wax, carnauba wax, castor wax, esparto wax, japan wax, ouricury wax, rice bran wax, soy wax, tallow tree wax, beeswax, Chinese wax, lanolin wax (wool wax), shellac wax, spermaceti wax, and mixtures thereof.

The solid waxes may as well be mineral, synthetic waxes and/or petroleum derived waxes, and may have a melting point of 27° C.–220° C. They may preferably be selected from the group consisting of paraffin wax, microcrystalline wax, ceresin wax, montan wax, ozocerite wax, polyethylene wax, peat wax, and mixtures thereof.

The non-water soluble particles may be solid resins. The solid resin may be plant and/or animal and/or petroleum derived resins and/or synthetic resin preferably selected from the group consisting of petroleum resin such as asphaltite and Utah resin, insect resins such as shellac, plant resins such as copals, dammars, mastic, and sandarac, oleo-resins (frankincense, elemi, turpentine, copaiba), gum resins and Aleppo pine resin, synthetic resins such as bisphenol A diglycidyl ether and silicone resins. More preferred solid resins are selected from plant based resins such as furan, rosin and gum resins.

The non-water soluble particles of the present invention may be inorganic and/or organic pigments.

The fillers and pigments used as non-water soluble particles may preferably be selected from the group consisting of clay, calcium carbonate, titanium dioxide, talc, iron oxides, barium sulfate, barium carbonate, aluminium sulfate, kaolinite, calcium magnesium carbonate, magnesium carbonate, satin pigment, zinc oxide and zinc sulfide, more preferably selected from clay, titanium dioxide, and aluminum sulfate and mixtures thereof.

The composition can additionally comprise an acid or basic catalyst which has in particular the role of adjusting the temperature at which crosslinking begins. The catalyst can be chosen from Lewis bases and acids, such as clays, colloidal or noncolloidal silica, organic amines, quaternary amines, metal oxides, metal sulphates, metal chlorides, urea sulphates, urea chlorides and catalysts based on silicates.

The catalyst can also be a phosphorus-comprising compound, for example an alkali metal hypophosphite salt, an alkali metal phosphite, an alkali metal polyphosphate, an alkali metal hydrogenphosphate, a phosphoric acid or an alkylphosphonic acid. Preferably, the alkali metal is sodium or potassium.

The catalyst can also be a compound comprising fluorine and boron, for example tetrafluoroboric acid or a salt of this acid, in particular an alkali metal tetrafluoroborate, such as sodium tetrafluoroborate or potassium tetrafluoroborate, an alkaline earth metal tetrafluoroborate, such as calcium tetrafluoroborate or magnesium tetrafluoroborate, a zinc tetrafluoroborate and an ammonium tetrafluoroborate. Preferably, the catalyst is sodium hypophosphite, sodium phosphite and the mixtures of these compounds.

The amount of catalyst introduced into the composition can represent up to 20 wt %, preferably up to 10%, and advantageously is at least equal to 1%.

In an embodiment of the invention, the PEC composition comprises chitosan, CMC and citric acid. In a preferred embodiment of the invention, the PEC composition may comprise 0.75-6 wt % chitosan, 0.75-6 wt % CMC and 6-30 wt % citric acid monohydrate. In a further preferred embodiment of the invention, the PEC composition comprises 0.75-6 wt % chitosan, 0.75-6 wt % CMC and 6-24 wt % citric acid monohydrate. In a further preferred embodiment of the invention the PEC composition comprises 0.75-4 wt % chitosan, 0.75-4 wt % CMC and 6-24 wt % citric acid monohydrate.

In a further preferred embodiment of the invention, the PEC composition comprises 0.75-2 wt % chitosan, 0.75-2 wt % CMC, 9-12 wt % citric acid monohydrate, and 0.75-4 wt % non-water soluble particles. The non-water soluble particles may comprise bioplastic or protein particles. In an embodiment of the invention, the PEC composition comprises 0.75 wt % chitosan, 0.75 wt % CMC, 9 wt % citric acid monohydrate, and 0.75-1.5 wt % non-water soluble particles. In another embodiment of the invention, the PEC composition comprises 2 wt % chitosan, 2 wt % CMC, 12 wt % citric acid monohydrate, and 2-4 wt % non-water soluble particles.

In an embodiment of the above disclosed PEC compositions comprising chitosan, CMC, citric acid and non-water soluble particles, the non-water soluble particles may comprise bioplastic particles, preferably polylactic acid (PLA) particles. The PEC:bioplastic particles weight ratio may be 1:0.5 to 1:2, more preferably the weight ratio may be 1:1 to 1:2. The bioplastic particles preferably comprise PLA-particles. In preferred embodiments of the invention, the PEC composition may further comprise plasticizer, surfactant and/or stabilizer.

In an embodiment of the above disclosed PEC compositions comprising chitosan, CMC, citric acid and non-water soluble particles, the non-water soluble particles may comprise protein particles, preferably soy protein concentrate (SPC), lupine protein concentrate (LPC), pea protein (PP), wheat gluten (WG) and/or vital wheat gluten (VWG). The PEC composition may comprise PEC:protein particles with weight ratio 1:0.5 to 1:2.40. The PEC composition may further comprise defoamer.

The objects of the invention are also attained by a method of preparing the above disclosed embodiments of PEC compositions. The method comprises the steps of mixing chitosan, anionic polymer, acid, preservative, water and non-water soluble particles and optionally one or more additives. The method may comprise one or more homogenization steps.

In a preferred embodiment, the method comprises the steps of:
a) Adding the anionic polymer to water,
b) Adding chitosan to the resulting mixture in step a,
c) Mixing the acid with water, and adding the resulting acidic solution to the resulting mixture in step b,
d) Adding one or more particle types to the resulting mixture in step c,
e) Adding a preservative to the resulting mixture in d, and wherein the resulting mixtures in steps a-e are mixed and optionally homogenized.

The objects of the invention are also attained by using the above disclosed embodiments of PEC compositions as a binder for fiber based, textile, woven and nonwoven materials. The use of the PEC composition is preferably for providing mechanical properties to said fiber based materials, textiles, woven and nonwoven materials, and wherein said mechanical properties are selected from dry strength, wet strengths, tensile stiffness and tensile softness The objects of the invention are also attained by fiber based, textile, woven and nonwoven materials comprising the above disclosed embodiments of PEC compositions as a binder.

The objects of the invention are also attained by an apparatus comprising the above disclosed embodiments of PEC compositions as a binder. The apparatus is any kind of laboratory or industrial equipment using low or high shear forces for producing; the PEC compositions. This might be a magnet stirrer, overhead stirrer with propeller or disperser or like, homogenizer with or without high pressure, in-line or external homogenizers, extruders, shaking equipment, mortar and pestle, blender type of instrument, any kind of mixer (static mixer, micro mixer, vortex mixer, industrial mixer, ribbon blender, V blender, continuous processor, cone screw blender, screw blender, double cone blender, double planetary, high viscosity mixer, counter-rotation, double and triple shaft, vacuum mixer, high shear rotor stator, dispersion mixer, paddle, jet mixer, mobile mixer, drum mixer, intermix mixer, planetary mixer, Banbury mixer or like), French press, disintegrator, mill (grinding by bead mill, colloid mill, hammer mill, ball mill, rod mill, autogenous mill, semi-autogenous grinding, pebble mill, high pressure grinding rolls, buhrstone mill, vertical shaft impactor mill, tower mill or ultrasonic treatment, rotor-stator mechanical equipment, any kind or propeller or mixer, high temperature and/or high pressure bitumen emulsifiers or combinations of the above.

The objects of the invention are also attained by a method of treating fiber based, textile, woven and nonwoven materials with the above disclosed embodiments of PEC compositions as a binder, comprising the steps of:
a. Treating the fiber based, textile, woven and nonwoven materials with a PEC composition by
  i. addition to fiber based and nonwoven suspensions,
  ii. spray coating,
  iii. dip coating,
  iv. roll coating,
  v. impregnation,
  vi. padding,
  vii. screen coating,
  viii. printing,
  ix. direct coating methods including knife coating, blade coating, wire wound bar coating, round bar coating and foam coating (e.g. crushed foam coating),
  x. indirect coating methods including mayer rod coating, direct roll coating, kiss coating, gravure coating and reverse roll coating,
  xi. ink jet and/or slit-die/slot-die, and
b. optionally curing the treated fiber based, textile, woven and nonwoven materials.

In a preferred embodiment, the method of treating comprises the step of curing the treated fiber based and nonwoven materials. In a further preferred embodiment, the curing is performed at 20° C. to 200° C., preferably at 80° C. to 190° C., more preferably at 120° C. to 180° C.

DETAILED DESCRIPTION OF THE PREFERRED EMBODIMENTS

The present invention relates to bio-based PEC compositions that are environmentally benign, renewable and biodegradable mixtures of a cationic biopolymer and an anionic biopolymer. The cationic and anionic polymers are balanced so that the net charge of the PEC is cationic. The PEC compositions are preferably prepared in the presence of an acid and further comprise non-water soluble particles. The PEC compositions are suitable as binders for fiber based materials, textiles, woven and nonwoven materials.

Non-water soluble particles refer herein to solid compounds having a solubility in water not exceeding 15 wt %. The non-water soluble particles of the present invention have a particle size preferably in the range of 100 nm-1 mm, more preferably of 100 nm-500 µm, even more preferably of 100 nm-300 µm.

According to the invention the use of the wording textiles, woven and nonwoven may include cloths or fabrics and may be based on natural or synthetic fibers and mixtures thereof.

Textiles, woven and nonwoven may consist of a network of natural and/or synthetic fibers often referred to as thread or yarn. Yarn is produced by spinning raw fibers of wool, flax, cotton, or other material to produce long strands. Textiles are formed by weaving, knitting, crocheting, knotting, or pressing fibers together (felt). The words fabric and cloth may for example be used in textile assembly trades (such as tailoring and dressmaking) as synonyms for textile. Textile may refer to any material made of interlacing fibers or nonwoven textiles. Fabric refers to any material made through weaving, knitting, spreading, crocheting, or bonding that may be used in the production of further goods (garments, etc.). Cloth may be used synonymously with fabric but often refers to a finished piece of fabric used for a specific purpose (e.g., table cloth). The wording textiles, woven and nonwoven according to the present invention may include all different types of textiles described above. Textiles, woven and nonwoven according to the invention can be made from many different types of materials and fibers for example animal, plant, wood, mineral, synthetic, sugar based, protein based for example wool, silk, mohair, cashmere, pygora, cameldown, alpaca, ilama, vicuna, guanaco, angora, qiviut, ramie, nettle, milkweed, cotton, linen, flax, jute, hemp, viscose, asbestos, glass fiber, rock fiber, nylon, elastan, polyester, acrylic, polyamide, polypropylene, polyurethane and its derivatives, cornfiber, coir, *yucca*, sisal, bamboo (rayon) fiber, peanut, soybased, chitin based, milk casein based, keratin based and poly lactic acid based etc. Further, nonwoven materials are fabric-like materials made from long fibers, bonded together by chemical, mechanical, heat or solvent treatment. Nonwoven fabrics are also defined as sheet or web structures bonded together by entangling fiber or filaments (and by perforating films) mechanically, thermally or chemically. The term is used in the textile manufacturing industry to denote fabrics, such as felt, which are neither woven nor knitted. They are flat or tufted porous sheets that are made directly from separate fibers, molten plastic or plastic film.

Fiber based materials refer to materials such as paper materials which comprise a high degree of cellulose. As will be understood by those skilled in the present field of art, numerous changes and modifications may be made to the above described and other embodiments of the present invention, without departing from its scope as defined in the appending claims. For example, the pulps for making fiber based materials may be any kind of pulp, i.e. mechanical pulp, thermo-mechanical pulp, chemo-mechanical pulp, sulphate pulp, sulphite pulp, bleached pulp, unbleached pulp, short-fiber pulp, long-fiber pulp, recycled fibers, mixtures of different pulp grades etc. The invention works irrespective of the kind of pulp chosen.

The Examples relate to comparative studies and for investigating the ability of PEC to create dispersions of non-water soluble particles such as bioplastics and proteins as well as the ability of PEC to transfer the properties of the dispersed particles to different materials through electrostatic attraction. To the person skilled in the art it will be obvious that the present invention can also be transferred to other types of particles such as pigments, fillers and similar non-water soluble particles.

The PEC composition according to the present invention can be used as a vehicle in the sense that said composition both has space for and fuel to transport other molecules. In more specific terms, the PEC composition can form a micelle around, for example non-water soluble particles comprised in the PEC composition and thanks to its positive charge, it can thereafter arrange itself towards negatively charged fibers and thus transfer the properties of the non-water soluble particles to the fiber based material.

EXPERIMENTAL SECTION

Charge Ratio

Charge density was measured using the Mütek PCD 02 device. Charge (symbol: q, unit: meqv) was calculated using Eq. 1.

$$q \text{ [meqv]} = C_{counter\ ion} \text{ [eqv/l]} \cdot V_{counter\ ion} \text{ [l]} \cdot 1000 \qquad (1)$$

where the counter ion is one of sodium polyethylenesulphate (PES-Na, anionic) or poly-diallyl-dimethyl-ammonium-chloride (poly-dadmac, cationic), depending on the charge of the colloid. If the charge at different concentrations are plotted against mass of the current colloid, the charge density (unit: meqv/g) is the slope of the linear curve. The mass of the colloid can be calculated with Eq. 2.

$$m\text{[g colloid]} = \text{wt \% colloid [g colloid/g solution]} \cdot g \text{ [g solution for 10 ml]} \cdot 0,0 \qquad (2)$$

When the charge densities were known for one polycation and one polyanion, the charge ratio was calculated between the polyelectrolytes so that the overall charge of the complex became positive (i.e. charge ratio <1), see Eq. 3.

$$\text{Charge ratio} = \frac{[\text{part of complex} \cdot \text{charge density}]_{polyanion}}{[\text{part of complex} \cdot \text{charge density}]_{polycation}} \qquad (3)$$

The method above is for measuring charge density and then calculate the charge ratio.

Experiment 1-8—Study of Various Hydrophobic Particles Included in the PEC Compositions and Evaluation of Said PEC Compositions on Nonwoven Background Experiments 1-8

The binder recipe OC-C (see details in abbreviations experiments 1-8) is based on polyelectrolyte complex (PEC). PEC gives good dry and wet mechanical properties to fiber based materials, nonwovens, paper and textiles. PEC can also be seen as a micelle that can emulsify for example non-water soluble particles. To mix PEC and non-water soluble particles can therefore lead to a dispersion that both gives good mechanical properties to materials (the PEC part of the dispersion) and that creates an additional property on the material which is derived from the particle the PEC composition carries (the particle part of the dispersion).

The experiments below demonstrate that PEC can support and stabilize non-water soluble particles in water to form dispersions. These are then further used as binders/additives on different materials and the properties measured. In the following examples the term particle PEC composition refers to polyelectrolyte complex dispersion containing non-water soluble particles while a polyelectrolyte complex formulation without particles is referred to non-particle PEC composition.

Abbreviations Experiments 1-8

Below, all abbreviations used in experiments 1-8 are listed.

| | |
|---|---|
| C | Chitosan |
| $CHCl_3$ | Chloroform |
| CMC | Carboxymethyl cellulose |
| DBS | Dibutyl sebacate |
| EC | Ethyl cellulose |
| EC N10 | Aqualon EC N10 |
| EC N100 | Aqualon EC N100 |
| ID46 | Polysorb ID46 |
| LPC | Lupine protein concentrate |
| MCC | Micro crystalline cellulose |
| MG | Maize gluten |
| NW | Nonwoven |
| OC-C | 2 wt % chitosan 90/100/A1, 2 wt % Finnfix 5, 12 wt % citric acid monohydrate, 0.2 wt % Nipacide BSM, produced according to Method 11 |
| PEC | Polyelectrolyte complex |
| PLA | Polylactic acid |
| PP | Pea protein |
| SPC | Soy protein concentrate |
| TBAC | tributyl acetyl citrate |
| WG | Wheat gluten |
| VWG | Vital wheat gluten |

Methods Experiments 1-8

Below, all methods used in experiments 1-8 are listed.

Method 1: Formulations diluted to 1 wt % and nonwoven treated with padder using 11.6 rpm and pressure 0.1 MPa followed by drying on stenter frame in Termaks oven 150° C. for 3 min.

Method 2: Test of hydrophobicity by adding drops of water on the surface. Grades for hydrophobicity: −−=hydrophilic and spreading, −=hydrophilic, +=droplet stays around 1 s, ++=droplet stays 10-30 s, +++=droplet stays >60 s and is defined as hydrophobic.

Method 3: Tensile test for dry nonwoven were performed by using Testometric M250-2.5AT (pretension: 0.01 N, sample length: 200 mm, width: 50 mm, speed: 100 mm/min, Load cell 1: 50 kgf) after acclimatization at 23° C. and 50% RH for 1 day. Three nonwoven sheets were treated and two test specimen for each treated piece was cut out and tested.

Method 4: Tensile test for wet nonwoven were performed by using Testometric M250-2.5AT (pretension: 0.01 N, sample length: 200 mm, width: 50 mm, speed: 100 mm/min, Load cell 1: 50 kgf) after having test specimens at least 20 h in 23° C. and 50% RH and then soaked in water for 15 min. Three nonwoven sheets were treated and two test specimen for each treated piece were tested.

Method 5: Use a bioplastic dispersion (see experiment 1) as the whole amount of "Water 1" in OC-C recipe. The amounts were multiplied with 0.5 to receive 50 g final product. In other words: 1. Homogenize 35.9 g water 1 and 1 g CMC Finnfix 5 using Ultraturrax T25 at 9000 rpm for 3 min. 2. Disperse 1 g chitosan in the CMC-solution. 3. Dissolve 6 g citric acid mono hydrate in 6 g water 2 and add to the CMC-solution. Homogenize at 12000 rpm for 3 min. 4. Add 0.1 g Nipacide. Homogenize 1 min.

Method 6: Dry content was measured by adding three times 10 g of the formulation in aluminum cups in the Termaks oven for 24 h (105° C.). The theoretical dry content was then calculated by the equation $(W2-W0)/W1$ where W2=weight of the cup, W1=weight of the original sample, W2=weight of the cup and the final sample.

Method 7: 50 g formulation is homogenized using Ultra Turrax T25 with speed 12000 rpm during 1 min after addition of non-water soluble particles.

Method 8: General description of production method for PEC composition without non-water soluble particles as additive (100 g formulation): 1. Homogenize 71.8 g water and 2 g CMC Finnfix 5 with Ultraturrax T25 at 9000 rpm for 3 min. 2. Disperse 2 g chitosan in the CMC-solution. 3. Dissolve 12 g citric acid mono hydrate in 12 g water and add to the biopolymer solution. Homogenize at 12000 rpm for 3 min. 4. Add 0.2 g Nipacide BSM. Homogenize 1 min.

Method 9: General description of production method for PEC composition including non-water soluble particles as additive (100 g formulation): 1. Homogenize 69.8 g water and 2 g CMC Finnfix 5 with Ultraturrax T25 at 9000 rpm for 5 min. 2. Disperse 2 g chitosan in the biopolymer solution. 3. Dissolve 12 g citric acid mono hydrate in 12 g water and add to the CMC-solution. Homogenize at 12000 rpm for 5 min. 4. Add 2 g particles to the mixture. Homogenize at 12000 rpm for 5 min. 5. Add 0.2 g Nipacide BMS. Homogenize 1 min. If needed, add 0.2 g Dispelair CF 56 during stirring at the end.

Equipment Experiments 1-8

Below, all equipment used in experiments 1-8 is listed.

pH was measured with pHenomenal pH1000H from VWR with Hamilton Polilyte Lab Temp BNC electrode (calibrated with buffers pH 4, 7 and 10).

Tensile tests were conducted using Testometric M250-2.5AT (machine capacity 2.5 kN) together with Wintest Analysis software.

Homogenization of formulations in lab scale was done using IKA T25 digital Ultra-Turrax.

Viscosity of formulations were measured with Brookfield DV-II+ Pro LV Viscometer together with Rheocal software using spindle LV4 at 200, 150, 100, 50, 10 and 6 rpm.

Coating of nonwoven was performed with Wichelhaus WI-MU 505 A horizontal padder.

Drying of treated paper and nonwoven were done in an oven from Termaks (with stenter frame from Wichelhaus Wi-LD3642 Minidryer/Stenter).

Visual evaluation of emulsions and dispersions was done using a Nikon Microphot-FXA with 10× lens.

Chemicals Experiments 1-8

Below, all chemicals used in experiments 1-8 are listed.

| Chemical name | Commercial name | Producer/Distributor |
|---|---|---|
| 1,2-Benzisothiazol-3(2H)-one, 2-methyl-2H-isothiazol-3-one | Nipacide BSM | Clariant |

-continued

| Chemical name | Commercial name | Producer/Distributor |
|---|---|---|
| Carboxymethyl cellulose (CMC) | FinnFix 5 | CP Kelco |
| Chitosan | Chitosan 90/100/A1 | Kraeber |
| Chloroform (CHCl₃) | | Sigma Aldrich |
| Citric acid mono hydrate | Citronsyra Mono E33 8-80M LT | Univar AB |
| Defatted toasted soy flour (soy protein concentrate) | Frasoy-D IP <0.9% | L.I. frank, Frank Food Products |
| Dibutyl sebacate (DBS) | | Arkema |
| Defoamer | Dispelair CF56 | Chemec |
| Ethyl acetate | | Sigma Aldrich |
| Ethyl cellulose (EC) N100 | Aqualon EC N100 | Ashland |
| Ethyl cellulose dispersion | Aquacoat ECD | FMC biopolymer |
| Ethyl cellulose water dispersion, 30 wt % | Aquacoat ECD | FMC Biopolymer |
| Isosorbid ester | Polysorb ID46 | Roquette |
| Maize gluten | Concentra P 13882 | Cargill |
| Micro crystalline cellulese (MCC) | Hightcel 90M MCC | Sigachi cellulose PVT LTD/Brenntag Nordic |
| Pea protein | Lysamine GPS | Roquette |
| PLA powder | | Tianjin Glory Tang Technology (through Per Sundblad, SPCC) |
| Polylactic acid (PLA) | Ingeo 10361D | Nature works |
| Polyoxyethylenesorbitan monopalmitate | Tween 40 | Sigma Aldrich |
| Polyvinyl alcohol PVOH | Mowiol 28-99 | Clariant |
| Sodium dodecyl sulfate (SDS) | | Sigma Aldrich |
| Sorbitol | Neosorb 70 | Roquette |
| Toasted lupine concentrate (lupine protein concentrate) | Fralu-con | L.I. frank, Frank Food Products |
| Tributyl acetyl citrate (TBAC) | | Tecnosintesi |
| Wheat gluten | Viten CWS | Roquette |
| Vital wheat gluten | Gluvital 21040 | Cargill |

Experiment 1—Study of the Dispersing Properties of PEC

To produce bioplastic particles of suitable size, solvent exchange method was used. The polymer and/or plasticizers were dissolved in an organic solvent. The surfactant and stabilizer were dissolved in water. The organic phase was slowly added to the aqueous phase during mixing using UltraTurrax. The organic solvent was then evaporated. See Table 1 for the composition of the PLA- and EC-dispersions used.

To disperse bioplastic particles using PEC, OC-C was produced with a bioplastic dispersion (Dispersion 5, 6 or 7) as the "Water 1" in the recipe according to Method 7.

The particle PEC compositions PEC/Dispersion 5 (called particle PEC composition 5), PEC/Dispersion 6 (called particle PEC composition 6) and PEC/Dispersion 7 (called particle PEC composition 7) show good film forming properties when making 400 μm films with film applicator (drying overnight in 23° C.). Also, the dispersions have an even and homogenous texture showing that it is possible to use PEC as an emulsifier of bioplastic particles. The dispersions also look homogenous and non-flocculating when studied in microscope.

Experiment 2—Study of the Hydrophobicity Contributed by the Particle PEC Compositions Comprising PEC and Bioplastic Particles by Adding Water Droplets on the Treated Material 100% viscose NW was treated according to Method 1 with the particle PEC compositions from experiment 1. Hydrophobicity of the particle PEC compositions was studied according to Method 2, see Table 2.

TABLE 2

The hydrophobicity of NW treated with PEC/bioplastic dispersions. Drop test (Method 2) was done day two and day five.

| Dispersion | Day 2 | Day 5 |
|---|---|---|
| Dispersion 5 | -- | -- |
| Particle PEC composition 5 | − | − to ++ |
| Dispersion 6 | -- | -- |
| Particle PEC composition 6 | − to + | − to + |
| Dispersion 7 | -- | -- |
| Particle PEC composition 7 | ++ to +++ | ++ to +++ |

Table 2 shows that the bioplastic dispersions themselves give hydrophilic NW (probably because of the surfactants) but together with the particle PEC composition of the invention the treated NW becomes hydrophobic. Particle PEC composition comprising PLA without softener gives the most hydrophobic NW.

Experiment 3—Study of the Curing Temperature on the Mechanical Properties of 100% Viscose Nonwoven by Particle PEC Compositions with and without Plasticized PLA Particles Coating of 100% viscose NW with particle PEC compositions comprising bioplastic particles was done according to

TABLE 1

Composition of PLA- and EC-dispersion prepared with organic solvent.

| Name | Polymer | Plasticizer | Organic solvent | Surfactant | Stabilizer | Water | Particle size d(0.5) (μm) | Dry content (%)[1] |
|---|---|---|---|---|---|---|---|---|
| Dispersion 5 (PLA + 22.5% TBAC) | PLA (2 g) | TBAC (450 mg) | CHCl₃ (20 ml) | SDS (0.16 g) | PVOH (0.32 g) | 160 g | 4.4 | 1.28 |
| Dispersion 6 (EC + 25% DBS) | EC N100 (2.5 g) | DBS (625 mg) | Ethyl acetate (50 ml) | SDS (0.16 g) | PVOH (0.32 g) | 160 g | 0.9 | 1.66 |
| Dispersion 7 (PLA) | PLA 10 g | — | CHCl₃ (100 ml) | SDS 1 g | — | 989 g | 21 | 1.25 |

[1]According to Method 8.

Method 1. Tensile tests were conducted according to Method 3. See results in Table 3. Dry tests were performed on 100% viscose NW.

TABLE 3

Mechanical properties for NW treated with non-particle PEC composition and particle PEC compositions and cured in two different temperatures.

| | DRY | |
|---|---|---|
| Sample | Tensile stiffness index (Nm/g) | stadv |
| Reference, untreated | 170.3 | 11.9 |
| OC-C, 150° C. | 891.7 | 196.5 |
| OC-C, 180° C. | 936.4 | 348.4 |
| Particle PEC composition 5, 150° C. | 1358.7 | 396.2 |
| Particle PEC composition 6, 150° C. | 968.4 | 157.7 |
| Particle PEC composition 6, 180° C. | 981.1 | 203.08 |
| Particle PEC composition 7, 150° C. | 897.9 | 272.9 |
| Particle PEC composition 7, 180° C. | 1324.4 | 118.1 |

Dry tensile stiffness increases significantly when PLA particles are used in PEC composition compared to PEC composition without. The required curing temperature, when using pure PLA particles in the PEC composition, is higher (180° C.) than when using PLA plasticized particles (150° C.) in the PEC composition, to reach similar dry tensile stiffness. This is due to the lowering of the melting point of the PLA particles imparted by the plasticizer. This gives the end user of the particle PEC composition an option to choose PLA particle PEC composition with and without a PLA plasticizer depending on the curing temperature used in the process. EC particles have no or small effect on the tensile stiffness index of the treated material.

Experiment 4—Study of the Influence of the Mechanical Properties of 100% Viscose Nonwoven by Particle PEC Compositions In experiment 3 PLA particles used in the particle PEC composition had smaller particle size (see table 1) compared to the size of PLA particles used in particle PEC compositions in experiment 4.

Grinded PLA-powder with mixed particle size was filtered through 150 mesh wire, equal to <100 μm holes, and tested together with PEC in a particle PEC composition. The PEC-particles used had a melting point of 170° C. The filtered particles were dispersed in OC-C according to Method 7 to reach the ratio PEC:PLA-powder 1:1 and 1:2.

Treatment of NW was done according to Method 1 (curing in 140° C. and 170° C.). Dry properties were tested to investigate the dependence of ratio PEC:PLA, curing temperature and time. Tensile tests were done according to Method 3. The results are presented in Table 4

TABLE 4

Dry mechanical properties for NW treated with the particle PEC compositions comprising PEC:PLA-particles (150 mesh) with ratio 1:1 and 1:2.

| | | DRY | |
|---|---|---|---|
| Ratio PEC:PLA-particles | Curing conditions | Tensile stiffness index (Nm/g) | stadv |
| 1:1 | 140° C. 2 min | 697.3 | 154.0 |
| | 140° C. 4 min | 896.6 | 164.0 |
| | 170° C. 2 min | 1015.1 | 228.7 |
| | 170° C. 4 min | 1253.1 | 65.6 |
| 1:2 | 140° C. 2 min | 643.3 | 164.7 |
| | 140° C. 4 min | 782.1 | 59.2 |
| | 170° C. 2 min | 788.0 | 107.6 |
| | 170° C. 4 min | 909.9 | 66.3 |

The difference in stiffness is dependent on both temperature and time. Curing at 140° C., did not melt all the PLA particles which could be observed on the material (dusty material). The stiffness did not increase when the ratio was changed from 1:1 to 1:2 PEC:PLA.

Based on the above conclusions NW was treated according to Method 1 (curing at 190° C. for 2, 4 and 6 min) to investigate the effect of curing time. Tensile tests were conducted according to Method 3. See results in Table 5. Dry tests were performed on 100% viscose NW.

TABLE 5

Dry mechanical properties for NW treated with non-particle PEC composition and particle PEC composition comprising PEC:PLA-particles (150 mesh) with ratio 1:1.

| | DRY PROPERTIES | | | | | |
|---|---|---|---|---|---|---|
| Treatment | Strain @ peak (%) | stadv | Tensile index (Nm/g) | stadv | Tensile stiffness index (Nm/g) | stadv |
| Untreated reference | 16.4 | 2.5 | 24.4 | 1.1 | 170.3 | 11.9 |
| OC-C 190° C. 2 min | 7.0 | 0.9 | 21.0 | 0.9 | 1600.9 | 141.6 |
| OC-C 190° C. 4 min | 7.73 | 1.9 | 20.6 | 0.7 | 1411.53 | 530.84 |
| OC-C 190° C. 6 min | 6.57 | 1.1 | 18.99 | 0.7 | 1799.32 | 236.03 |
| PEC + PLA-particles 1:1 190° C. 2 min | 10.5 | 1.4 | 22.8 | 1.2 | 1673.5 | 51.5 |
| PEC + PLA-particles 1:1 190° C. 4 min | 10.2 | 1.0 | 22.3 | 1.3 | 1447.1 | 261.3 |
| PEC + PLA-particles 1:1 190° C. 6 min | 8.0 | 0.7 | 22.9 | 1.0 | 1939.3 | 141.4 |

The percentage increase in the different mechanical properties were calculated from Table 5 and are presented in Table 6. The comparison is performed between non-particle PEC composition and particle PEC composition for each curing temperature and time.

TABLE 6

Increase in percentage of dry mechanical properties for particle PEC composition comprising PEC:PLA-particles (150 mesh) with ratio 1:1 in comparison to non-particle PEC composition OC-C.

| | Minutes of curing | DRY PROPERTIES | | |
|---|---|---|---|---|
| | | Increase in strain @ peak | Increase in tensile index (Nm/g) | Increase in tensile stiffness index (Nm/g) |
| Curing at 190° C. | 2 | 49.00 | 8.59 | 4.54 |
| | 4 | 32.08 | 8.40 | 2.52 |
| | 6 | 21.77 | 20.48 | 7.78 |

It is obvious that PLA-powder (melting point 170° C.) needs to melt properly to have an effect on the mechanical properties. Curing at 190° C. for 2 min results in 49% increase in strain/elongation for PEC compositions with addition of PLA-particles. Curing at 190° C. for 6 min results in 20% increase in dry tensile index for PEC compositions with addition of PLA-particles.

Experiment 5—Evaluation of the Stability of Particle PEC Compositions Through Performance Test To evaluate the stability of the particle PEC composition comprising PEC:PLA-particle (150 mesh) 1:1, a test to treat NW with 6 weeks old formulation was performed. The NW was treated according to Method 1 (curing at 190° C. for 2 min). Tensile tests were conducted according to Method 3 and Method 4. Results are shown in Table 7. Dry tests were performed on 100% viscose NW and wet tests on 100% bio-based NW.

TABLE 7

Test of stability of the particle PEC composition comprising PEC:PLA-powder (150 mesh) 1:1 by treating NW with 6 weeks old formulation. Curing was done in 190° C. for 2 min.

| | DRY PROPERTIES | | | | | | WET PROPERTIES | | | | | |
|---|---|---|---|---|---|---|---|---|---|---|---|---|
| Treatment | Strain @ peak (%) | stadv | Tensile index (Nm/g) | stadv | Tensile stiffness index (Nm/g) | stadv | Strain @ peak (%) | stadv | Tensile index (Nm/g) | stadv | Tensile stiffness index (Nm/g) | stadv |
| Freshly produced | 10.5 | 1.4 | 22.8 | 1.2 | 1673.5 | 51.5 | 12.6 | 2.2 | 5.6 | 0.6 | 162.1 | 19.4 |
| Stored 6 weeks at 23° C. | 9.6 | 1.6 | 20.9 | 1.5 | 1358.7 | 255.8 | 12.8 | 2.4 | 5.9 | 0.4 | 191.3 | 38.3 |

There is no significant change between the two series which shows that the particle PEC composition is stable.

The same stability study was performed for particle PEC composition 5 and particle PEC composition 6. The NW was treated according to Method 1 (curing at 180° C. for 3 min). Tensile tests were conducted according to Method 3 and Method 4. The results are shown in Table 8. Dry tests were performed on 100% viscose NW and wet tests on 100% bio-based NW.

TABLE 8

Test of stability of the particle PEC composition by treating NW with 7 weeks old formulation. Curing was done in 180° C. for 3 min.

| | DRY PROPERTIES | | | | WET PROPERTIES | | | |
|---|---|---|---|---|---|---|---|---|
| Treatment | Tensile index (Nm/g) | stadv | Tensile stiffness index (Nm/g) | stadv | Tensile index (Nm/g) | stadv | Tensile stiffness index (Nm/g) | stadv |
| Particle PEC composition 5, freshly produced | 17.5 | 6.9 | 1058.2 | 165.7 | 5.7 | 0.2 | 229.9 | 12.1 |
| Particle PEC composition 5, Stored for 7 weeks at 23° C. | 21.0 | 1.7 | 1006.4 | 296.0 | 5.9 | 0.7 | 182.3 | 47.0 |

TABLE 8-continued

Test of stability of the particle PEC composition by treating NW with 7 weeks old formulation. Curing was done in 180° C. for 3 min.

| Treatment | DRY PROPERTIES | | | | WET PROPERTIES | | | |
|---|---|---|---|---|---|---|---|---|
| | Tensile index (Nm/g) | stadv | Tensile stiffness index (Nm/g) | stadv | Tensile index (Nm/g) | stadv | Tensile stiffness index (Nm/g) | stadv |
| Particle PEC composition 6, freshly produced | 17.1 | 1.6 | 981.1 | 203.08 | 5.1 | 0.5 | 161.6 | 35.4 |
| Particle PEC composition 6, Stored for 7 weeks at 23° C. | 21.9 | 0.5 | 990.2 | 290.6 | 5.4 | 0.4 | 219.2 | 24.6 |

As can be seen in Table 8, both the dry tensile stiffness and the wet tensile index are more or less unchanged for 7 weeks old particle PEC composition. One property that changes over time is dry tensile index which seems to slightly increase as the formulation is aged yielding a stronger material.

Experiment 6—Production of Particle PEC Composition Comprising Protein Powders and their Stability Since PEC disperses bioplastic particles well, it was tested to disperse other types of hydrophobic particles such as proteins (soy protein concentrate (SPC), lupine protein concentrate (LPC), pea protein (PP), wheat gluten (WG), vital wheat gluten (VWG)). Particle PEC composition with the ratio PEC:protein powder 1:0.5 was produced according to Method 7. A defoamer was added in 0.2 wt % concentration to reduce foam, resulting in smooth formulations which did not separate during storing for at least 1.5 months.

Experiment 7—Influence of the Mechanical and Surface Properties of 100% Viscose Nonwoven by Particle PEC Compositions Comprising Protein Powders NW was treated with particle PEC composition comprising proteins with the ratio 1:0.5 (produced according to Method 7) according to Method 1. Tensile tests were conducted according to Method 3 and Method 4. See Table 9 for results. Dry tests were performed on 100% viscose NW and wet tests on 100% bio-based NW.

TABLE 9

Dry and wet mechanical properties for nonwoven treated with particle PEC composition comprising proteins with ratio PEC:protein 1:0.5.

| Treatment | DRY PROPERTIES | | | | | | WET PROPERTIES | | | | | |
|---|---|---|---|---|---|---|---|---|---|---|---|---|
| | Strain @ peak (%) | stdv | Tensile index (Nm/g) | stdv | Tensile stiffness index (Nm/g) | stdv | Strain @ peak (%) | stdv | Tensile index (Nm/g) | stdv | Tensile stiffness index (Nm/g) | stdv |
| Ref untreated | 16.4 | 2.5 | 24.4 | 1.1 | 170.3 | 11.9 | 17.7 | 2.7 | 1.4 | 0.1 | 22.5 | 3.3 |
| OC-C | 12.9 | 1.0 | 25.3 | 1.0 | 891.7 | 196.5 | 18.9 | 3.0 | 3.4 | 0.2 | 102.5 | 6.4 |
| PEC:VWG 1:0.5 | 13.5 | 0.7 | 22.3 | 1.6 | 1060.4 | 163.7 | 15.6 | 2.0 | 3.3 | 0.3 | 105.6 | 33.8 |
| PEC:PP 1:0.5 | 11.6 | 1.8 | 21.5 | 1.1 | 1356.3 | 229.8 | 18.0 | 1.9 | 4.2 | 0.3 | 116.4 | 29.1 |
| PEC:LPC 1:0.5 | 9.5 | 1.8 | 15.3 | 0.9 | 1240.4 | 214.4 | 18.2 | 2.3 | 2.7 | 0.3 | 77.1 | 16.1 |
| PEC:SPC 1:0.5 | 13.7 | 1.4 | 22.8 | 1.0 | 929.4 | 283.1 | 19.4 | 3.0 | 3.0 | 0.3 | 94.5 | 38.8 |

Same treated materials were tested for hydrophobicity according to method 2 presented in table 10.

TABLE 10

Hydrophobicity according to method 2 for material treated with particle PEC composition comprising proteins with ratio PEC:protein 1:0.5.

| Particle PEC composition | Day 1 | Day 5 |
|---|---|---|
| PEC:VWG | + to +++ | ++ to +++ |
| PEC:PP | − | − |
| PEC:LPC | + | ++ to +++ |
| PEC:SPC | −− | − |

Besides the fact that the tested proteins result in good dispersions, it is seen that by adding VWG to PEC, the wet strength can be increased. Almost all of the tested protein powders did not affect the dry tensile index negatively, showing that the powders did not interfere with the binding properties of PEC. Hydrophobic properties could be achieved by incorporating VWG and LPC. On the other hand, the inherent hydrophilicity of the PEC composition could be maintained when incorporating PP and at the same time boosting up wet strength.

Summary of Experiment 1-8

PEC creates stable dispersions of bioplastic particles. The PEC compositions comprising bioplastic particles show good dry mechanical properties on NW. The dry mechanical properties are increasing with temperature and time. While the melting point of bioplastic particles is individual for each type of plastic, the treatment temperature and time need to be optimized for each case. The treated NW are showing low to excellent hydrophobicity.

PEC also creates good dispersions of many non-water soluble protein powders. NW treated with PEC composition comprising protein powders increase:
  wet strength (PP) with maintained hydrophilicity,
  hydrophobicity without losing dry mechanical properties (VWG), PLA is known to degrade in water and especially in acidic conditions which is a requirement for forming the PEC. This is however not observed in PLA PEC compositions of the present invention shown by the fact that mechanical properties change very little over time when comparing treated materials using freshly prepared particle PEC composition vs. aged composition.

Experiments 9-11—Addition of PEC Compositions to Pulp Suspensions

To evaluate the ability of the particle PEC composition to transfer particle properties to fibers in a fiber suspension, paper sheets were produced where PEC composition without particles and particle PEC compositions were added in the wet end of the paper process respectively and compared. The formed paper sheets were evaluated with tensile tests, contact angle measurements and Gurley.

Abbreviations Experiments 9-11

Below, all abbreviations used in experiments 13-14 are listed.

C Chitosan
CMC Carboxymethyl cellulose
OC-C (2 wt % chitosan 90/100/A1, 2 wt % Finnfix 5, 12 wt % citric acid mono hydrate, 0.2 wt % Nipacide BSM) produced according to Method 11
PEC + PLA OC-C but with 71.8 wt % water in the recipe exchanged with Dispersion 7 (1% PLA with 0.1% SDS as only additional compound) produced according to Method 12
PEC Polyelectrolyte complex
PLA Polylactic acid Methods Experiments 9-11

Method 10: Pulp suspension consisting of sodium hydrogen sulfate bleached CTMP fibres (mean fibre length 1.2-1.5 mm) from Rottneros was prepared in 18-22° C. tap water and diluted to 0.5 wt %. The total amount (40 l) was divided to 2.5 l and the pH was adjusted to 5.5-6.5 with citric acid solution (citric acid mono hydrate:tap water, 1:2) in every batch, prior to use. The strength system (i.e. PEC composition) was then added to the pulp suspension in different amounts and stirred vigorously with a propeller 10 min before the sheet forming was started. The pH was controlled 1-2 times during this 10 min and adjusted to <6.5 if it had risen.

Method 11: Paper sheets were produced using Rapid Köthen sheet former and then dried for 8 min at 92° C. under vacuum (about 100 kPa). The resulting sheets got a paper density of around 60 g/m$^2$. Five sheets at each test point were made. In some cases, additional drying was performed at 190° C. for 3 min in a Termaks oven.

Method 12: Tensile tests for dry paper sheets were performed by using Testometric M250-2.5AT (pretension: 0.1 N, sample length: 100 mm, sample width: 15 mm, speed: 20 mm/min, Loadcell 0: 50 kgf) after having test specimens at least 1 day at 23° C. and 50% RH. Three test specimen for each paper sheet were cut out and tested.

Equipment Experiments 9-11

Below, the equipment used in examples 9-11 is listed.

pH in formulations and paper suspension was measured with pHenomenal pH1000H from VWR with Hamilton Polilyte Lab Temp BNC electrode (calibrated with buffers pH 4, 7 and 10).

Homogenization of formulations in lab scale was performed using IKA T25 digital Ultra-Turrax.

Pulp suspension was created using a pulper Tico 732 Hengstler from PTI Austria.

Paper sheets were produced on lab scale using Rapid-Köthen sheet former type RK-2A.

Stirring of formulations and pulp suspensions was done with an overhead stirrer from IKA (either Eurostar digital IKA-Werke or IKA RW28 basic) together with a propeller.

Additional drying of papers from Rapid Köthen was done in an oven from Termaks (suspended with clamps).

Tensile tests were conducted using Testometric M250-2.5AT (machine capacity 2.5 kN) together with Wintest Analysis software.

Contact angles were measured with PGX Serial 50585 from FIBRO Systems AB together with the software The PocketGonimeter Program version 3.3

Gurley was measured with L&W Densometer (Type: 6_4, No.: 2241) from Lorentzen&Wettre

Chemicals Used in Experiments 9-11

Below, all chemicals used in experiments 9-11 are listed.

| Chemical name | Commercial name | Producer/ Distributor |
| --- | --- | --- |
| 1,2-Benzisothiazol-3(2H)-one, 2-methyl-2H-isothiazol-3-one | Nipacide BSM | Clariant |
| Carboxymethyl cellulose | FinnFix 5 | CP Kelco |
| Chitosan | Chitosan 90/100/A1 | Kraeber |
| Citric acid monohydrate | Citronsyra Mono E33 8-80M LT | Univar AB |
| Sodium dodecyl sulfate (SDS) | | Sigma Aldrich |
| Sunflower oil | Sunflower oil 745100 | AAK |
| PLA | Ingeo 10361D | Natureworks |

Experiment 9—Influence of Particle PEC Compositions on the Mechanical Properties of Paper Sheets Paper suspension was made according to Method 10 and paper sheets with and without additives were produced according to Method 11. Since the amount of PEC in relation to fibers is important, it was decided to add the two formulations (OC-C and PEC+PLA) to the paper suspension so that amount of solid content in the formulations in relation to fibers became 1% respectively.

The formulations were diluted to 1 wt % based on total solid content (i.e. 10 g formulation and 130 g and 150 g water for OC-C and PEC+PLA, respectively), to receive a lower viscosity. Dry tensile tests were conducted using Method 15. The results are shown in Table 11.

TABLE 11

Additions of OC-C and PEC + PLA. Addition to fiber is calculated on the total solid content in the formulations.

| Formulation | Drying temp [° C.] | Addition to fiber (dry/dry) [%] | Mean tensile index [Nm/g] | Stdav tensile index [Nm/g] | Increase in tensile index [%] | Mean final strain [%] | Stdav final strain [%] | Increase in final strain [%] | Mean tensile stiffness index [Nm/g] | Stdav tensile stiffness index [Nm/g] | Increase in tensile stiffness index [%] |
| --- | --- | --- | --- | --- | --- | --- | --- | --- | --- | --- | --- |
| ref | 95 | 0 | 18.84 | 2.11 | | 1.03 | 0.16 | | 2800.54 | 221.34 | |
| OC-C | 95 | 1 | 19.65 | 1.74 | 4.31 | 1.09 | 0.12 | 5.50 | 2726.42 | 153.53 | −2.65 |
| PEC + PLA | 95 | 1 | 22.80 | 1.22 | 21.00 | 1.16 | 0.11 | 12.97 | 3128.06 | 154.98 | 11.70 |

Since PLA melts above 95° C. (which is the drying temperature in Rapid Köthen) it was tested to dry half the numbers of the paper sheet for the OC-C and PEC+PLA series at 190° C. for 3 min, see Table 12.

TABLE 12

Additions of OC-C and PEC + PLA. Addition to fiber is calculated on the total solid content in the formulations. The increases in different properties are based on the reference series that only has been dried in 95° C. in the Rapid Köthen dryer.

| Formulation | Drying temp [° C.] | Addition to fiber (dry/dry) [%] | Mean tensile index [Nm/g] | Stdav tensile index [Nm/g] | Increase in tensile index [%] | Mean final strain [%] | Stdav final strain [%] | Increase in final strain [%] | Mean tensile stiffness index [Nm/g] | Stdav tensile stiffness index [Nm/g] | Increase in tensile stiffness index [%] |
| --- | --- | --- | --- | --- | --- | --- | --- | --- | --- | --- | --- |
| ref | 190 | 0 | 21.52 | 1.02 | 14.21 | 1.31 | 0.08 | 26.92 | 2480.12 | 183.92 | −11.44 |
| OC-C | 190 | 1 | 22.65 | 1.45 | 20.22 | 1.42 | 0.09 | 38.04 | 2403.85 | 140.94 | −14.16 |
| PEC + PLA | 190 | 1 | 26.13 | 1.13 | 38.71 | 1.45 | 0.14 | 40.46 | 2841.61 | 193.35 | 1.47 |

The inclusion of PLA to the PEC composition clearly shows that the PLA properties are transferred to the fibers in a pulp suspension. This yields a 21% increase in tensile index and a 11.7% increase in tensile stiffness index if the paper sheets are dried at 95° C. (see table 11). The differences in paper sheet properties are also obvious when comparing PLA PEC compositions (PEC+PLA) with only PEC composition (OC-C).

When paper sheets are subjected to an additional drying step (190° C./3 min) tensile index increase is further elevated to about 39% and increase on final strain to about 40% (see table 12). This further demonstrates the effect PLA PEC composition has on the paper sheets.

Experiment 10—Influence of Particle PEC Compositions on the Surface Properties of Paper Sheets Measured by Contact Angle Contact angles for sheets produced according to Method 10 and Method 11 were measured. Table 13 shows the dynamic contact angle over a period of 60 s for paper with OC-C and PEC+PLA as additive when the 0.5% and 1% (d/d) additions to fiber was calculated on the total solid content.

In table 13 it can be seen that when using OC-C or PEC composition of the invention (PEC+PLA) as additive to pulp suspension a relatively elevated initial contact angle can be achieved which diminishes quickly. However, increasing drying time and temperature to 190° C. for 3 minutes yields a contact angle of 71.3° over 60 second for the PEC+PLA composition.

TABLE 13

Contact angle for papers with additions of OC-C and PEC + PLA. Addition to fiber is calculated on the total solid content in the formulations.

| Formulation | Drying temp [° C.] | Addition to fiber (dry/dry) [%] | Dynamic contact angle [°] | | |
|---|---|---|---|---|---|
| | | | 1 s | 30 s | 60 s |
| Ref | 95 | 0 | <45 | 0 | 0 |
| OC-C | 95 | 0.5 | <45 | 0 | 0 |
| | 95 | 1 | 79.4 | 0 | 0 |
| PEC + PLA | 95 | 0.5 | 47.2 | 0 | 0 |
| | 95 | 1 | <45 | 0 | 0 |
| PEC + PLA | 190° C. | 0.5 | 91.2 | 0 | 0 |
| 190° C. | 190° C. | 1 | 92.4 | 83.2 | 71.3 |

Experiment 11—Influence of Particle PEC Compositions on the Air Permeability Properties of Paper Sheets Measured Using the Gurley Method To investigate if the air permeability of the paper sheets (i.e. the internal structure and the surface finish of the paper) is affected when the PEC compositions were used as additives in the wet end of the paper making process, the Gurley method was used and Gurley seconds for 100 cc were determined.

Two paper sheets for each test point were measured at three different spots. The results are shown in table 14.

TABLE 14

Gurley (100 CC) for paper sheets with additions of OC-C and PEC + PLA. Addition to fiber is calculated on the PEC solid content in the formulations. Two sheets were tested at three spots.
Gurley for 100 CC [Gurley seconds]

| Formulation | Drying temp [° C.] | Addition to fiber (dry/dry) [%] | Mean [Gurley seconds] | stdav |
|---|---|---|---|---|
| Ref | 95 | 0 | 3.6 | 0.7 |
| OC-C | 95 | 0.5 | 3.5 | 0.5 |
| | 95 | 1 | 2.9 | 0.2 |
| PEC + PLA | 95 | 0.5 | 2.4 | 0.2 |
| | 95 | 1 | 2.3 | 0.2 |
| PEC + PLA | 190° C. | 0.5 | 2.4 | 0.2 |
| 190° C. | 190° C. | 1 | 2.3 | 0.2 |

Table 14 shows that the Gurley is lower (air permeability is higher) for the sheets including PEC+PLA (both when compared to reference sheets and sheets containing OC-C). From this it can be concluded that the PLA particles from PEC+PLA composition make the paper sheets more porous, nevertheless both stiffer and stronger.

Summary of Experiments 9-11

In the above examples it is shown that PEC can transfer the hydrophobic, mechanical and surface properties of PLA, in the particle PEC composition, to the formed paper sheets.

Materials treated with the PEC composition of the present invention need curing to develop the mechanical and hydrophobic properties meant through treatment. The curing can be done at temperatures between 20° C. and 200° C., preferably between 80° C. and 190° C., more preferably between 120° C. and 180° C. For reaching the best results, the curing temperature and time need to be optimized for each material and process.

As will be understood by those skilled in the present field of art, numerous changes and modifications may be made to the above described and other embodiments of the present invention, without departing from its scope as defined in the appending claims. For example, the pulps may be any kind of pulp, i.e. mechanical pulp, thermo-mechanical pulp, chemo-mechanical pulp, sulphate pulp, sulphite pulp, bleached pulp, unbleached pulp, short-fibre pulp, long-fibre pulp, mixtures of different pulp grades etc. The invention works irrespective of the kind of pulp chosen.

The term paperboard is here used as wide term including all kinds of different cellulose-based board grades, e.g. paper board, cardboard, corrugated board, single or multiply board, folding boxboard, chipboard etc.

While for the clarity reasons, the PEC compositions are described in the following claims only as binders for fiber based materials, textiles, woven and nonwoven materials (i.e. applied in the dry end of the process), it is equally understood that they can act as strength additives in the wet end of the process.

A various number of plasticizers may be used together with plastics known in the art without departing from the scope of the invention.

Other type of particles may be used instead of plastics such as proteins, inorganic fillers, resins, pigments.

Various aspects and embodiments of the present invention are defined by the following numbered claims.

The invention claimed is:

1. Method of treating materials comprising fiber based materials, textiles, woven materials or nonwoven materials, comprising:

applying a bio-based polyelectrolyte complex (PEC) composition suitable as a binder to the materials, wherein the PEC composition comprises: cationic biopolymer, anionic biopolymer, acid, and a preservative, wherein the net charge of the PEC is cationic, the charge ratio of the anionic biopolymer and the cationic biopolymer is ≤1, the cationic biopolymer is chitosan, wherein the chitosan has a degree of deacetylation being 66-100%, the anionic biopolymer is selected from the group consisting of lignin alkali, lignosulfonic acid, and a polysaccharide, the acid is a Brønsted acid and/or a Lewis acid, wherein the Brønsted acid is selected from any organic and/or inorganic acids, wherein the Lewis acid is selected from any cationic mono- or multivalent atom, the weight ratio between the cationic biopolymer and the anionic biopolymer is 1:0.1 to 1:20, the weight ratio between the cationic biopolymer and the acid is 1:0.01 to 1:30, the pH is less than 7, and wherein said composition in addition comprises non-water soluble particles selected from one or more of plastic particles, bioplastic particles, protein particles, hydrophobic particles, solid wax, and solid resins, and wherein a weight ratio of PEC:non-water soluble particles is 1:0.1 to 1:10.

2. The method of treating according to claim 1, further comprising a step of curing the treated fiber based materials, textiles, woven and nonwoven materials, wherein the curing is performed within the range of 20° C. to 220 ° C.

3. The method of treating according to claim 1, wherein said fiber based material consists of paper and/or paperboard and said treatment is performed either during manufacture of said paper and/or paperboard or on already finished paper and/or paperboard.

4. The method of treating according to claim 1, comprising applying the PEC composition to said fiber based materials, textiles, woven and nonwoven materials by one or more of:

spray coating,
dip coating,
roll coating,
impregnation,
padding,
screen coating,
printing, direct coating methods selected from at least one of knife coating, blade coating, wire wound bar coating, round bar coating, crushed foam coating, ink jet coating, slit die coating and slot-die coating; and indirect coating methods selected from at least one of mayer rod coating, direct roll coating, kiss coating, gravure coating and reverse roll coating, inkjet, slit-die and slot-die, and a) optionally performing curing of the treated fiber based materials, textiles, woven and nonwoven materials at a temperature of 20 to 200° C.

5. The method of treating according to claim 1, comprising diluting the PEC composition with water selected from distilled water, tap water, and deionized water and treating the fiber based materials, textiles, woven and nonwoven materials with the diluted PEC composition.

6. The method of treating according to claim 1, comprising increasing hydrophobicity of said materials.

7. The method of treating according to claim 1, comprising increasing hydrophilicity of said materials.

8. The method of treating according to claim 1, comprising increasing dry strength of said materials.

9. The method of treating according to claim 1, comprising increasing wet strength of said materials.

10. The method of treating according to claim 1, comprising increasing tensile stiffness of said materials.

11. The method of treating according to claim 1, comprising increasing tensile softness of said materials.

* * * * *